(12) United States Patent
Kumamoto

(10) Patent No.: US 9,019,282 B2
(45) Date of Patent: Apr. 28, 2015

(54) DISPLAY DEVICE AND METHOD FOR CONTROLLING THE DISPLAY DEVICE

(71) Applicant: Seiko Epson Corporation, Tokyo (JP)

(72) Inventor: Osamu Kumamoto, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 13/655,061

(22) Filed: Oct. 18, 2012

(65) Prior Publication Data

US 2013/0106869 A1 May 2, 2013

(30) Foreign Application Priority Data

Oct. 28, 2011 (JP) ................................. 2011-237384

(51) Int. Cl.
*G06F 15/00* (2006.01)
*H04N 21/41* (2011.01)
*H04N 21/442* (2011.01)
*H04N 21/472* (2011.01)
*H04N 21/482* (2011.01)

(52) U.S. Cl.
CPC ..... *H04N 21/4122* (2013.01); *H04N 21/44231* (2013.01); *H04N 21/47217* (2013.01); *H04N 21/482* (2013.01)

(58) Field of Classification Search
CPC ................ G09G 5/006; G09G 3/2092; G09G 2300/0434; G09G 2320/0276; G09G 2360/02; G09G 2340/0407; G09G 2340/125; G09G 2340/14; G09G 2340/0435; G09G 3/36; G09G 5/005; H04N 1/00233; H04N 21/4307; H04N 21/4402; H04N 7/181; H04N 5/775; H04N 5/783; H04N 21/47202; H04N 7/17318; H04N 21/41407; H04N 13/0454; H04N 13/0459; H04N 5/93; H04N 21/2343; H04N 21/2387; H04N 21/2393; H04N 21/25825; H04N 21/4314; H04N 21/4622; H04N 7/0122; H04N 21/440263; G06F 3/14
USPC ........................... 345/501; 348/571; 382/307
See application file for complete search history.

(56) References Cited

U.S. PATENT DOCUMENTS 7,898,535 B2 * 3/2011 Juenger ......................... 345/204
2011/0107386 A1 * 5/2011 de los Reyes et al. ........ 725/118

FOREIGN PATENT DOCUMENTS

WO    WO-98-20476    5/1998

* cited by examiner

*Primary Examiner* — Kee M Tung
*Assistant Examiner* — Haixia Du
(74) *Attorney, Agent, or Firm* — ALG Intellectual Property, LLC

(57) ABSTRACT

A display device used by being connected to an external video apparatus that reproduces a video content includes: a signal determining section determining the type of a video signal of a video content input from the external video apparatus; a projection setting section making display settings based on the type thus determined, a video projecting section displaying the video content based on the set display settings; and a control command transmitting section transmitting, to the external video apparatus, a reproduction command for starting the reproduction of the video content and a rewind command for reproducing the video content from the head thereof after the projection setting section makes display settings.

7 Claims, 5 Drawing Sheets

DISPLAY DEVICE AND METHOD FOR CONTROLLING THE DISPLAY DEVICE

The entire disclosure of Japanese Patent Application No. 2011-237384, filed Oct. 28, 2011 is expressly incorporated by reference herein.

BACKGROUND

1. Technical Field

The present invention relates to a display device that is used by being connected to an external video (moving image) apparatus reproducing a content and displays the content when the external video apparatus reproduces the content and a method for controlling the display device.

2. Related Art

In the past, as a display device, a liquid crystal projector that is connected to a computer supplying an analog video signal and projects and displays an image on a screen, the image obtained by sampling, for each of the pixels of a liquid crystal shutter, the analog video signal input from the computer, has been known (see WO 98/20476). The liquid crystal projector makes display settings (sampling parameter settings) such as resolution setting based on the input analog video signal and projects and displays the image based on the display settings.

Incidentally, in recent years, a display device that connects, in place of a computer, a portable terminal (such as a smartphone, a PDA, and a portable recorder) storing a video content to a projector and displays the content by using the projector has been known. That is, the portable terminal inputs a video signal of the content into the projector, and the projector projects and displays the input video signal on the screen. The existing configuration in which the display settings are automatically made may be applied to the projector that is used by being connected to the portable terminal as described above.

However, when the portable terminal is connected to the projector, the projector generally cannot obtain the video signal before reproduction of the content. Therefore, the content is being reproduced while the display settings are being made based on the input video signal, and, when display is started based on the display settings, a certain length of content has already been reproduced. As a result, the head of the content is cut and not displayed (so-called missing of a content head occurs).

SUMMARY

An advantage of some aspects of the invention is to provide a display device that can prevent a situation in which the head of a content is cut and not displayed and a method for controlling the display device.

A display device according to an aspect of the invention is a display device that is used by being connected to an external video apparatus that reproduces a content, the display device including: a signal determining section determining the type of a video signal of the content input from the external video apparatus; a display setting section making display settings based on the type thus determined; a display section displaying the content based on the set display settings; and a request signal transmitting section transmitting, to the external video apparatus, a first request signal for starting reproduction of the content and a second request signal for reproducing the content from the head thereof after the display setting section makes display settings.

With this configuration, since a request signal (a second request signal) for reproducing the content from the head thereof is transmitted after display settings are made, it is possible to reproduce the content from the head thereof by the second request signal. This prevents a situation in which the head of the content is cut and not displayed and makes it possible to display the content from the head thereof. Strictly speaking, "reproduction" here refers to outputting video signals of a content sequentially with the progress of the content.

Moreover, it is possible to prevent the video signal from being displayed in a state in which display settings appropriate for the video signal are not made.

Furthermore, when the reproduction start position of the content is not the head of the content, by temporarily stopping the reproduction of the content until display settings are made, it is possible to minimize the length of video content that is reproduced while no display is performed.

In addition, since the sound which is reproduced with the video is also reproduced from the head thereof, it is possible to prevent the sound from being output without the head thereof.

Moreover, it is possible to make screen display size setting, refresh rate setting, and screen aspect ratio setting based on the type of the video signal of the content.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
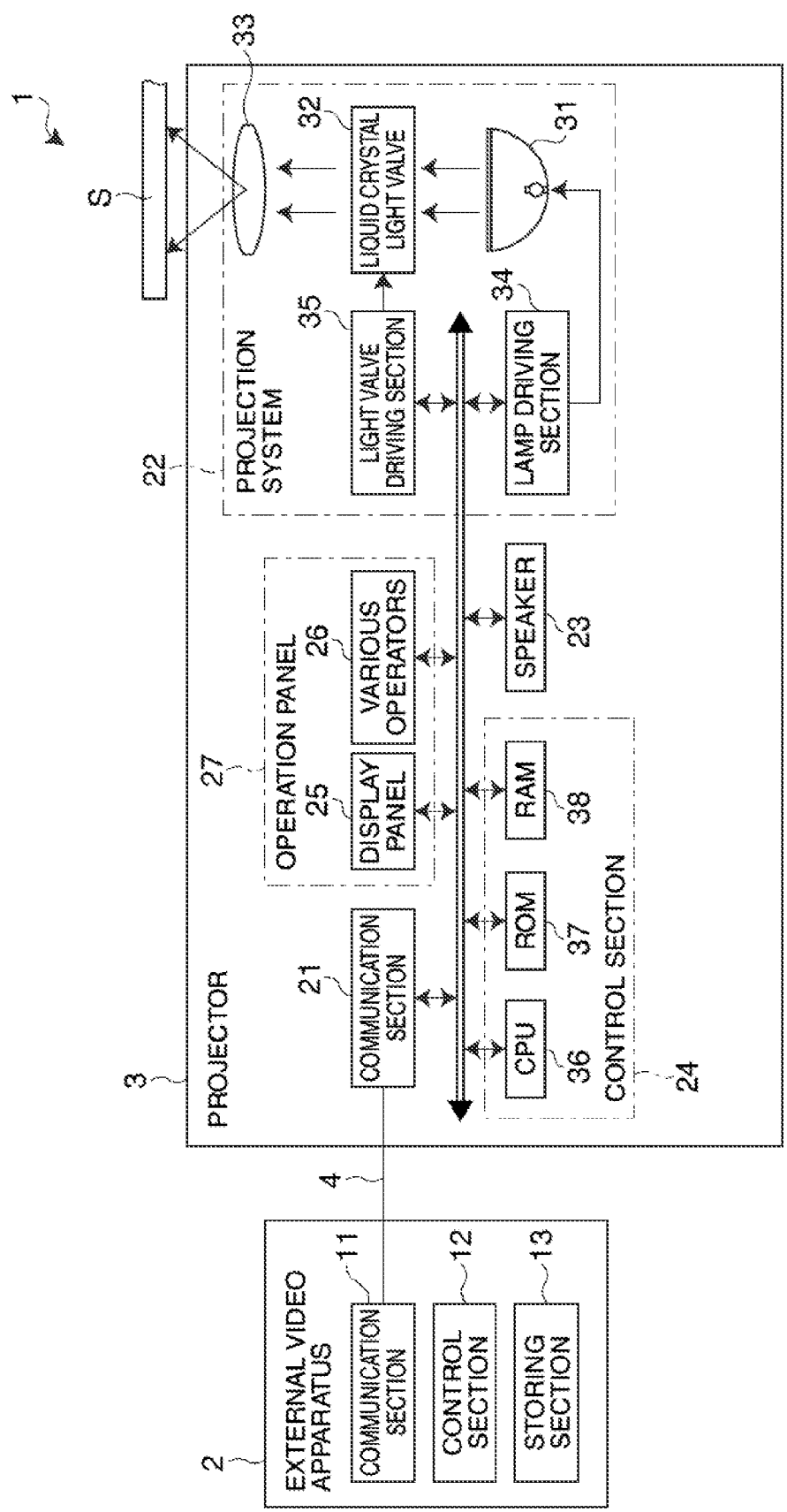
FIG. 1 is a system configuration diagram of a video display system according to an embodiment.

Hereinafter, a display device and a method for controlling the display device according to an embodiment of the invention will be described with reference to the accompanying drawings. In this embodiment, a video display system including, as a component element, a projector which is a display device is taken up as an example. As shown in FIG. 1, a video display system 1 includes an external video apparatus 2 that reproduces a video content (a content) and a projector 3 that is used by being connected to the external video apparatus 2 via a cable 4. That is, the video content stored in the external video apparatus 2 is projected and displayed on a screen S by using the projector 3.

As the external video apparatus 2, a predetermined external video apparatus (hereinafter referred to as "a portable terminal"), such as a smartphone, a PDA, or a portable recorder, which cannot determine a signal type before reproduction of a video content and an external video apparatus other than the above-described predetermined external video apparatus, the external video apparatus, such as a DVD recorder, which can determine a signal type before reproduction of a video content can be used, and both of them have a communication section 11, a control section 12, and a storing section 13. The cable 4 is connected to the communication section 11, and the communication section 11 performs communication with the projector 3. The control section 12 performs overall control of the external video apparatus 2. The storing section 13 stores various kinds of information including a video content.

The projector 3 includes a communication section 21 to which the cable 4 is connected, the communication section 21 performing communication with the external video apparatus 2, a projection system 22 projecting video onto the screen S, a speaker 23 outputting sound, and a control section 24 controlling these component elements. Moreover, in the projector 3, an operation panel 27 having a display panel 25 and various operators 26 is provided, making it possible for the user to perform various kinds of setting operations.

The projection system 22 projects an image onto the screen S, and has a light source lamp 31, a liquid crystal light valve 32, a projection lens 33, a lamp driving section 34, and a light valve driving section 35.

As the light source lamp 31, a halogen lamp, a metal halide lamp, or a high-pressure mercury lamp can be used. Moreover, in place of the light source lamp 31, a solid-state light source such as a laser or an LED may be used. The liquid crystal light valve 32 is formed of a liquid crystal panel etc. formed of a pair of transparent substrates between which a liquid crystal is encapsulated. On the inner surface of each transparent substrate, transparent electrodes that can apply a drive voltage to the liquid crystal for each micro region are formed as pixels in a matrix. The lamp driving section 34 turns on the light source lamp 31 based on a lighting instruction from the control section 24. The light valve driving section 35 sets the light transmittance of each pixel by applying the drive voltage corresponding to a projection image to each pixel of the liquid crystal light valve 32.

With the above configuration, in the projection system 22, the illumination light emitted from the light source lamp 31 is modulated as a result of passing through the liquid crystal light valve 32. Moreover, the modulated image lights are combined in each pixel by an unillustrated light combining system (such as a dichroic prism) and projected onto the screen S by the projection lens 33.

The control section 24 is formed of a CPU 36, ROM 37, RAM 38, and the like. The CPU 36 is a central processing unit performing various kinds of arithmetic processing and performs overall control of the projector 3 by performing signal input and output with the individual sections. The ROM 37 stores a control program product and control data used by the CPU 36 for performing various kinds of arithmetic processing. Moreover, the ROM 37 also stores an OS (operating system) which is basic software. The RAM 38 is used as a work area used when the CPU 36 performs various kinds of arithmetic processing.

Figure 2:
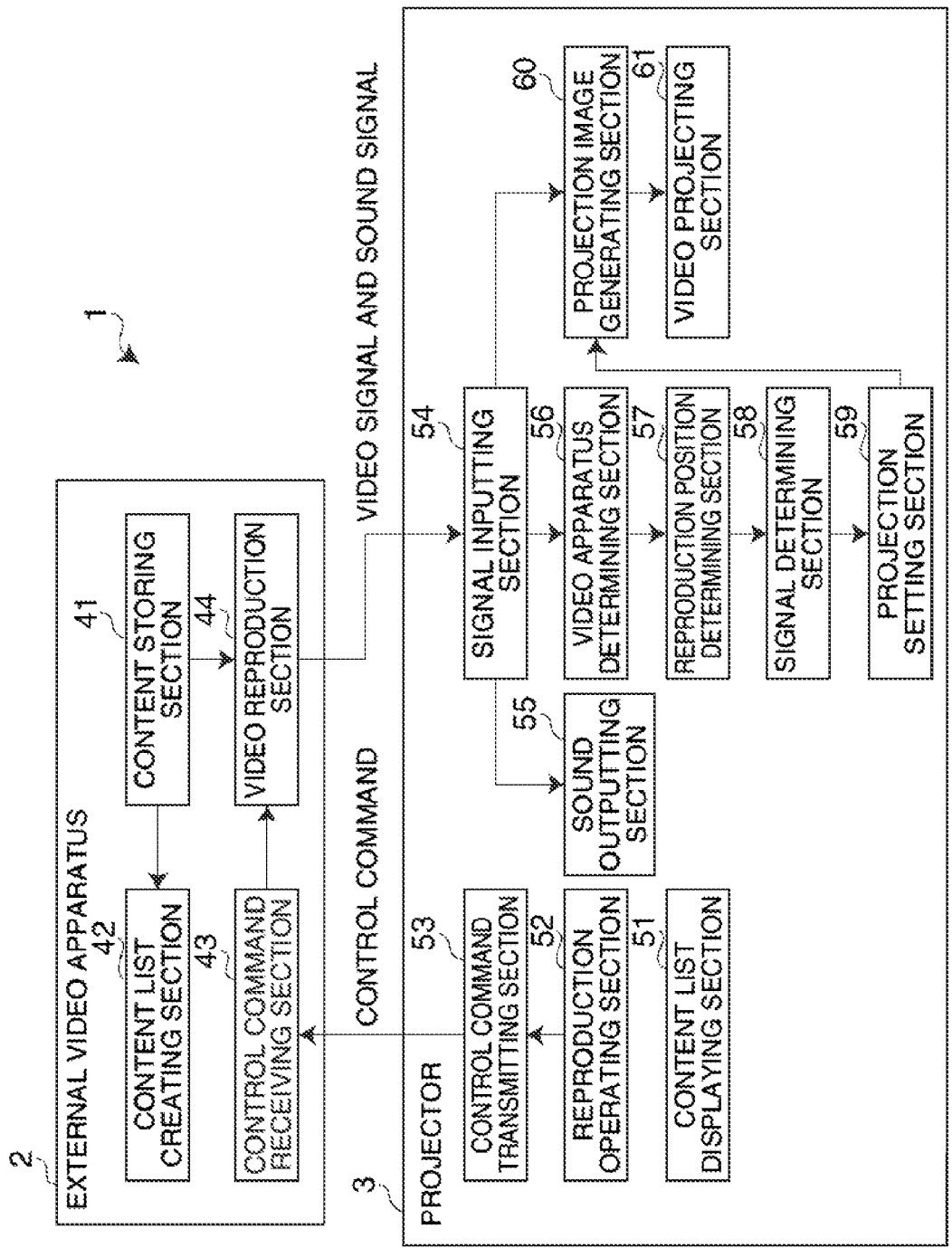
FIG. 2 is a functional block diagram of the video display system.

Here, the functional configuration of the external video apparatus 2 and the projector 3 will be described with reference to a functional block diagram of FIG. 2. As shown in FIG. 2, the external video apparatus 2 includes a content storing section 41, a content list creating section 42, a control command receiving section 43, and a video reproduction section 44.

The content storing section 41 includes the storing section 13 as a principal portion thereof and stores one or more video contents. Incidentally, the video content contains video and sound which are synchronized with each other. The content list creating section 42 creates a content list which is a list of video contents stored in the content storing section 41.

The control command receiving section 43 includes the communication section 11 as a principal portion thereof and receives a control command (a request signal) from the projector 3. As the control command, there are a reproduction command for starting the reproduction of the video content, a rewind command for reproducing the video content from the head thereof, a pause command for temporarily stopping the reproduction of the video content, a resumption command for resuming the reproduction of the video content by unpausing the reproduction of the video content, and other commands. Incidentally, with the reproduction command, the video content is reproduced from a reproduction position stored in the external video apparatus 2 in advance. That is, when the head of the video content is stored as a reproduction position, the video content is reproduced from the head thereof. On the other hand, when the reproduction of the video content is temporarily stopped, a reproduction position indicating a position where the reproduction of the video content was stopped is stored in the external video apparatus 2. In such a case, the video content is reproduced from the position where the reproduction of the video content was stopped.

The video reproduction section 44 includes the communication section 11 as a principal portion thereof and controls the reproduction of the video content by receiving the control command from the projector 3. During reproduction of the video content performed by the video reproduction section 44, video signals of the video content are sequentially output (transmitted) to the projector 3 with the progress of the video content. Incidentally, a sound signal is added to a video signal, and the sound signals are sequentially output with the video signals.

The projector 3 includes a content list displaying section 51, a reproduction operating section 52, a control command transmitting section (a request signal transmitting section) 53, a signal inputting section 54, a sound outputting section 55, a video apparatus determining section 56, a reproduction position determining section 57, a signal determining section 58, a projection setting section (a display setting section) 59, a projection image generating section 60, and a video projecting section 61. Incidentally, a display section in the sense of the appended claims is formed of the projection image generating section 60 and the video projecting section 61.

The content list displaying section 51 includes the communication section 21 and the display panel 25 as a principal portion thereof, obtains the content list from the external video apparatus 2, and displays the content list on the display panel 25. The reproduction operating section 52 includes the various operators 26 as a principal portion thereof and is operated for selecting a video content to be reproduced from the displayed content list.

The control command transmitting section 53 includes the communication section 21 as a principal portion thereof and transmits the control commands (the reproduction command, the rewind command, the pause command, and the resumption command) to the external video apparatus 2. That is, the projector 3 requests the video content reproduction control in the external video apparatus 2 by transmitting the control commands as appropriate.

The signal inputting section 54 includes the communication section 21 as a principal portion thereof and sequentially inputs, to the projector 3, the video signals of the video content from the external video apparatus 2. At this time, the signal inputting section 54 inputs the video signals with the sound signals added thereto. The sound outputting section 55 includes the speaker 23 as a principal portion thereof and sequentially outputs the input sound signals.

When the external video apparatus 2 is connected, the video apparatus determining section 56 determines the type of the connected external video apparatus 2. In a precise sense, the video apparatus determining section 56 determines whether or not the connected external video apparatus 2 is a portable terminal. The reproduction position determining section 57 determines the reproduction start position of the video content based on the input video signal. In a precise sense, the reproduction position determining section 57 determines whether or not the reproduction start position of the video content is the head of the video content.

The signal determining section 58 determines the type of the video signal of the video content based on the input video signal. The type here refers to the standards for the video signals, the standards defining the screen display size, the refresh rate, the screen aspect ratio, and the video signal system (such as an RGB signal, a component signal, or a composite signal). The projection setting section 59 makes projection settings (display settings: device settings) for the input video signal based on the type thus determined. The projection settings include the screen display size setting, the refresh rate setting, the screen aspect ratio setting, etc. of the projection image generating section 60, and these settings are made to have optimum setting values in accordance with the type thus determined. Incidentally, in addition to the settings described above, signal conversion system setting may be made in accordance with the type of the video signal.

The projection image generating section 60 generates a projection image from the input video signal based on the projection settings made by the projection setting section 59. That is, the projection image generating section 60 generates a projection image based on the screen display size, the refresh rate, and the screen aspect ratio which are set by the projection setting section 59.

The video projecting section 61 includes the projection system 22 as a principal portion thereof and projects and displays the generated projection image on the screen S. That is, since the video signals of the video content are sequentially input, the video projecting section 61 sequentially projects and displays the projection images based on the video signals on the screen S. In this way, the video projecting section 61 projects and displays the video signals of the video content on the screen S. Incidentally, video projection and display by the video projecting section 61 is performed in synchronization with sound output by the sound outputting section 55.

Figure 4:
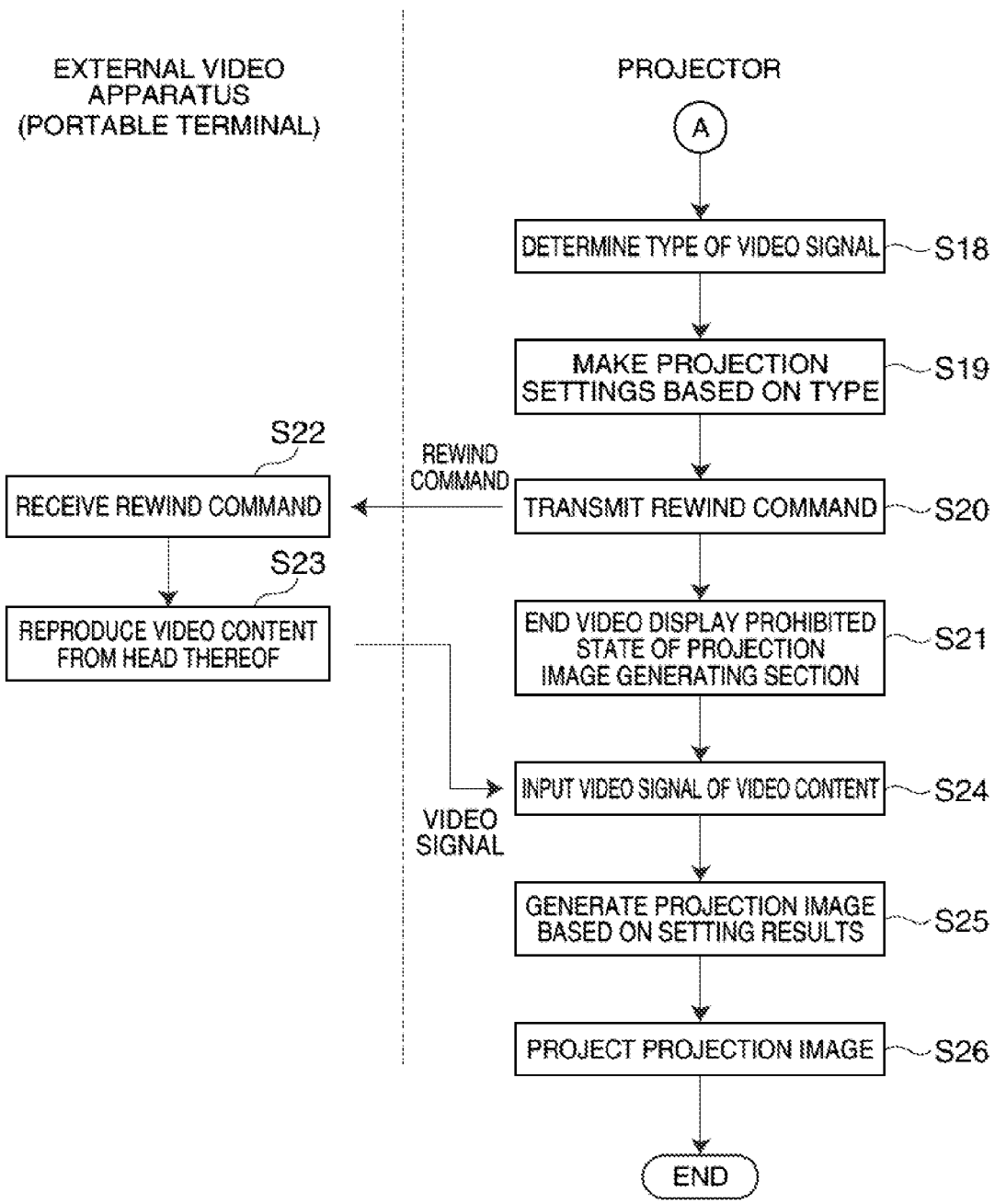
FIG. 4 is a flowchart showing one branch flow (S18 to S26) in the second half of the video display operation performed by the video display system.
Figure 5:
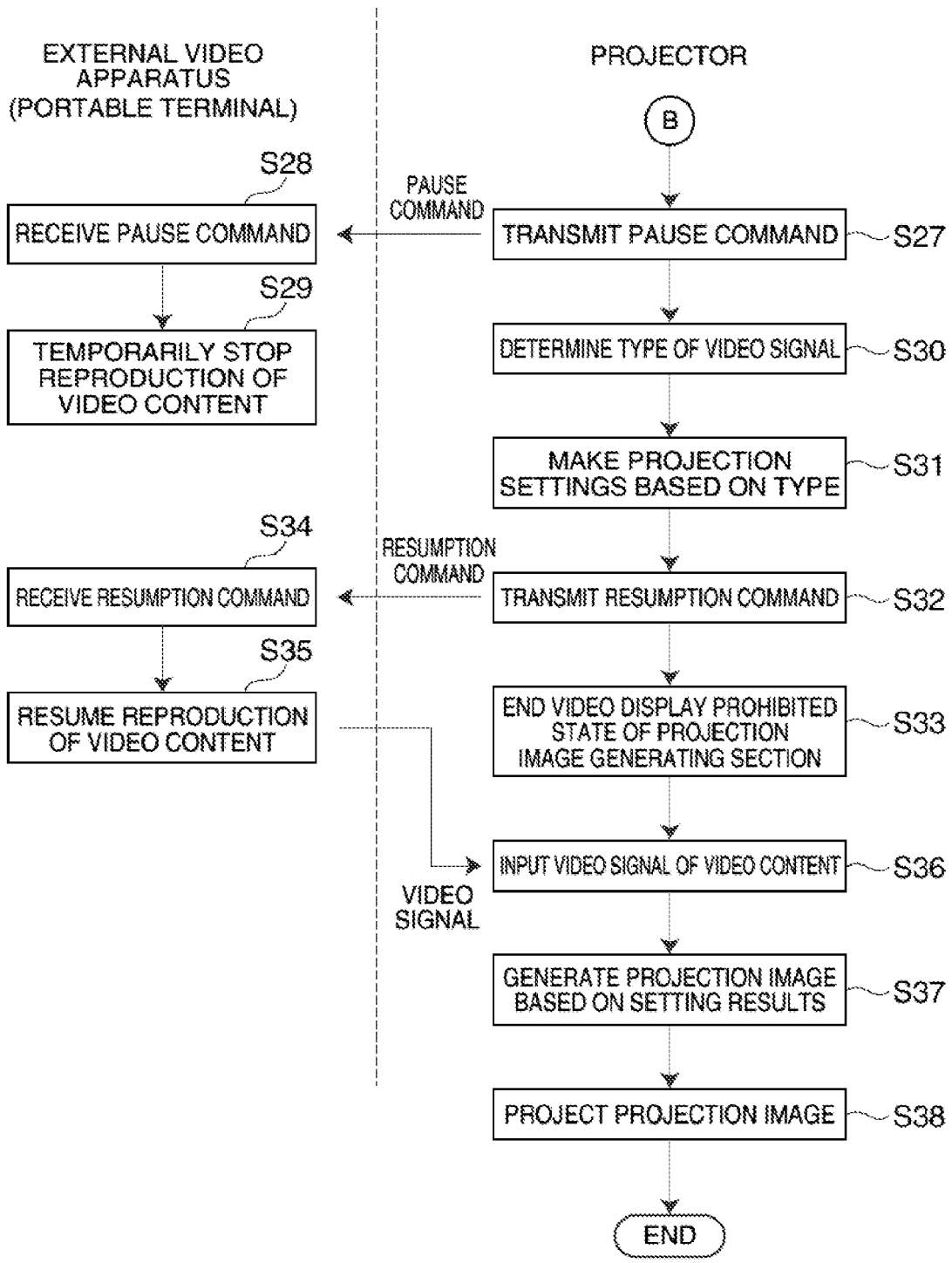
FIG. 5 is a flowchart showing the other branch flow (S27 to S38) in the second half of the video display operation performed by the video display system.

Next, a video display operation performed by the video display system 1 will be described with reference to FIGS. 3 to 5. The video display operation starts when the external video apparatus 2 is connected to the projector 3.

Figure 3:
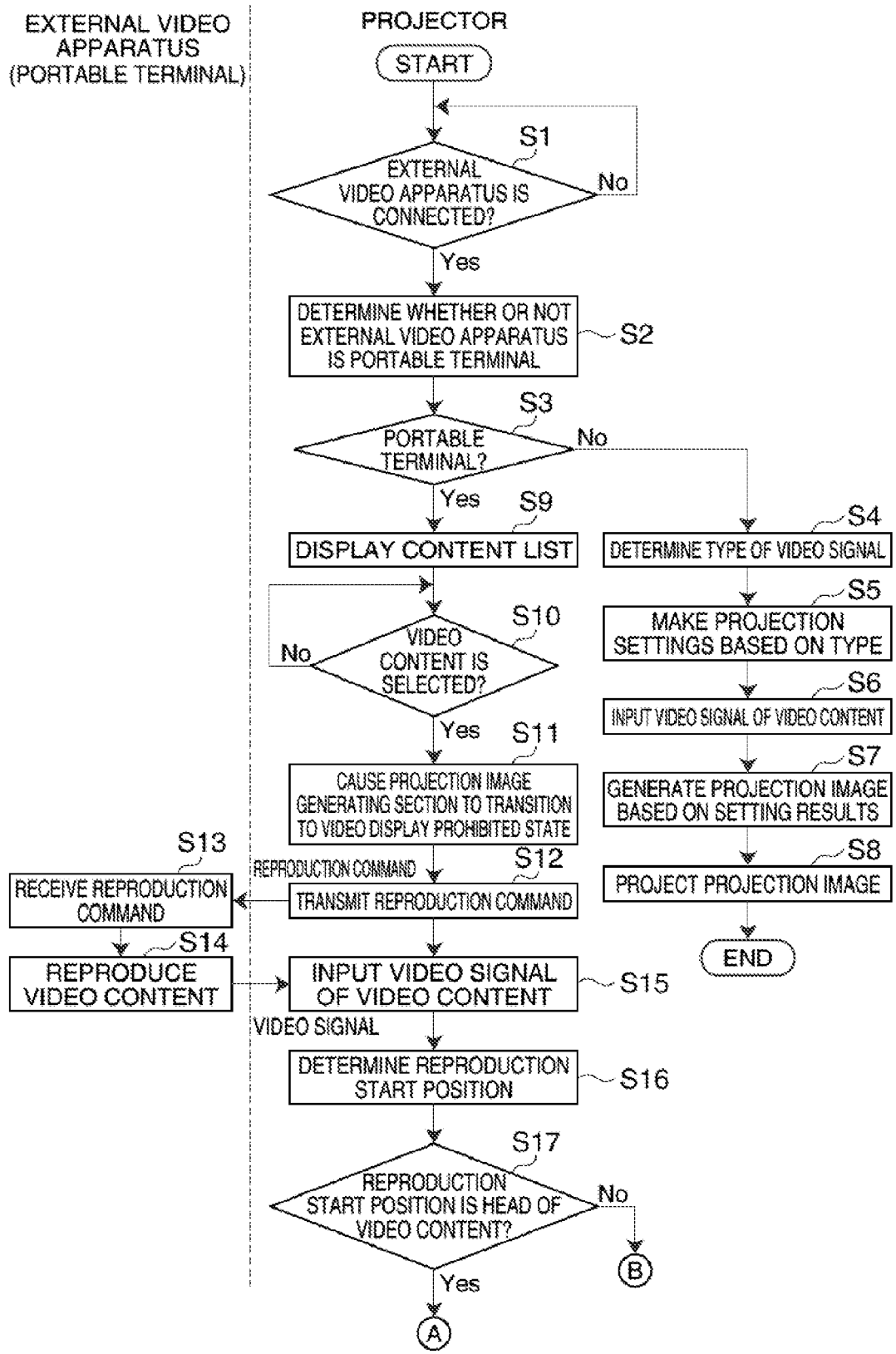
FIG. 3 is a flowchart showing the first half (S1 to S17) of a video display operation performed by the video display system.

As shown in FIG. 3, when the external video apparatus 2 is connected to the projector 3 (S1: Yes), the projector 3 determines, by the video apparatus determining section 56, whether or not the connected external video apparatus 2 is a portable terminal (S2).

If the external video apparatus 2 is not a portable terminal (S3: No), since the external video apparatus 2 is an external video apparatus that can determine the type of the video signal before reproduction of a video content, the projector 3 first determines the type of the video signal by the signal determining section 58 (S4) and makes projection settings for the video signal by the projection setting section 59 based on the type thus determined (S5). This allows the video signal to be projected at optimum setting values. Then, since the video signals of the video content are sequentially output from the external video apparatus 2, the projector 3 inputs the video signals to the projector 3 by the signal inputting section 54 (S6). The projector 3 sequentially generates projection images from the video signals by the projection image generating section 60 based on the projection settings (the setting results) made by the projection setting section 59 (S7) and projects and displays the projection images generated by the video projecting section 61 (S8). This is the end of the video display operation.

On the other hand, if the external video apparatus 2 is a portable terminal (S3: Yes), the projector 3 displays a content list by the content list displaying section 51 (S9). Specifically, the projector 3 obtains a content list from the external video apparatus 2 and displays the content list on the display panel 25. When the projector 3 displays the content list, the state transitions to a state in which the projector 3 waits for the user to perform a selection operation (S10).

When the video content is selected by the user (S10: Yes), the projection image generating section 60 is caused to transition to a video display prohibited state (a blackout state) (S11). Then, the control command transmitting section 53 transmits a reproduction command (a first request signal) for reproducing the selected video content to the external video apparatus 2 (S12: request signal transmitting step). Incidentally, the video display prohibited state is a state in which projection and display by the video signal is rejected and a so-called video mute (AV mute) state.

On the other hand, the external video apparatus 2 receives a reproduction command by the control command receiving section 43 (S13) and reproduces the selected video content by the video reproduction section 44 in accordance with the reproduction command (S14). That is, the external video apparatus 2 sequentially outputs the video signals of the selected video content.

When the video signals are output, the projector 3 inputs the video signals to the projector 3 by the signal inputting section 54 (S15). Then, the projector 3 determines the reproduction start position of the video content associated with the reproduction command by the reproduction position determining section 57 based on the input video signals (S16). If the reproduction start position thus determined is the head of the video content (S17: Yes), as shown in FIG. 4, the projector 3 determines the type of the video signal by the video apparatus determining section 56 based on the input video signals (S18: signal determining step) and makes projection settings for the video signal by the projection setting section 59 based on the type thus determined (S19: display setting step). This allows the video signal to be projected at optimum setting values. Then, after the settings are made by the projection setting section 59, the projector 3 transmits a rewind command (a second request signal) by the control command transmitting section 53 (S20: request signal transmitting step), and ends the video display prohibited state of the projection image generating section 60 (S21). That is, in this case, the projection image generating section 60 maintains the video display prohibited state before transmission of the reproduction command after transmission of the rewind command until the reproduction of the video content is started.

On the other hand, the external video apparatus 2 receives the rewind command by the control command receiving section 43 (S22) and reproduces the video content which is being reproduced from the head thereof by the video reproduction section 44 in accordance with the rewind command (S23). That is, the external video apparatus 2 sequentially outputs the video signals of the video content from the head of the video content.

When the video signals are sequentially output, the projector 3 inputs the video signals to the projector 3 by the signal inputting section 54 (S24). Then, the projector 3 sequentially generates projection images from the video signals by the projection image generating section 60 based on the projection settings (the setting results) made by the projection setting section 59 (S25) and projects and displays the projection images generated by the video projecting section 61 (S26: display step). This is the end of the video display operation.

Moreover, if the reproduction start position thus determined is not the head of the video content (S17: No), after the reproduction start position is determined, as shown in FIG. 5, the projector 3 transmits a pause command (a pause request signal) to the external video apparatus 2 by the control command transmitting section 53 (S27). On the other hand, the external video apparatus 2 receives the pause command by the control command receiving section 43 (S28) and temporarily stops the reproduction of the video content by the video reproduction section 44 in accordance with the pause command (S29). Then, the projector 3 determines the type of the video signal by the video apparatus determining section 56 based on the input video signals (S30) and makes projection settings for the video signal by the projection setting section 59 based on the type thus determined (S31). This allows the video signal to be projected at optimum setting values. Then, after the settings are made by the projection setting section 59, the projector 3 transmits a resumption command (a resumption request signal) by the control command transmitting section 53 (S32) and ends the video display prohibited state of the projection image generating section 60 (S33). That is, in this case, the projection image generating section 60 maintains the video display prohibited state before transmission of the reproduction command after transmission of the resumption command until the reproduction of the video content is resumed.

On the other hand, the external video apparatus 2 receives the resumption command by the control command receiving section 43 (S34) and resumes the reproduction of the video content which was temporarily stopped by the video reproduction section 44 in accordance with the resumption command (S35). That is, the external video apparatus 2 sequentially outputs the video signals of the video content from the position in which the reproduction of the video content was temporarily stopped.

When the video signals are sequentially output, the projector 3 inputs the video signals to the projector 3 by the signal inputting section 54 (S36). Then, the projector 3 sequentially generates projection images from the video signals by the projection image generating section 60 based on the projection settings (the setting results) made by the projection setting section 59 (S37) and projects and displays the projection images generated by the video projecting section 61 (S38). This is the end of the video display operation.

Incidentally, though not shown in the drawings, the sound signals added to the video signals are input by the signal inputting section 54 with the input of the video signals (S6, S15, S24, and S36), and the sound signals are output by the sound outputting section 55 in synchronization with the projection of the projection images (S8, S26, and S38). Moreover, when the projection image generating section 60 is in the video display prohibited state, the sound outputting section 55 is put into a mute state (a silent state).

With the configuration described above, when the reproduction start position thus determined is the head of the video content, since a rewind command for reproducing the content from the head thereof is transmitted after projection settings are made, it is possible to reproduce the content from the head thereof by the rewind command. This prevents a situation in which the head of a content is cut and not displayed and makes it possible to display the content from the head thereof.

Moreover, by maintaining the video display prohibited state before transmission of the reproduction command after transmission of the rewind command until the reproduction of the content is started, it is possible to prevent the video signal from being displayed in a state in which projection settings appropriate for the video signal are not made.

Furthermore, when the reproduction start position of the content is not the head of the content, by temporarily stopping the reproduction of the content until projection settings are made, it is possible to minimize the length of video content that is reproduced while no display is performed.

In addition, since the sound which is reproduced with the video is also reproduced from the head thereof by the rewind command, it is also possible to prevent the sound from being output without the head thereof.

Incidentally, in this embodiment, the projection settings include the screen display size setting, the refresh rate setting, the screen aspect ratio setting, etc. of the projection image generating section 60. However, the projection settings simply have to include at least one of the screen display size setting, the refresh rate setting, the screen aspect ratio setting, etc. of the projection image generating section 60. For example, only one of the screen display size setting, the refresh rate setting, the screen aspect ratio setting, etc. of the projection image generating section 60 may be made based on the type of the video signal.

Moreover, in this embodiment, when the reproduction command is transmitted, if the reproduction position of the video content is stored in the external video apparatus 2, the reproduction start position of the video content is determined in accordance with the stored reproduction position. Instead, the reproduction start position of the video content may be selected in the projector 3.

Furthermore, in this embodiment, the invention is applied to the video content containing video and sound. However, the invention may be applied to a video content containing only video or a sound content containing only sound.

Moreover, a light modulation element is not limited to a transmissive liquid crystal light valve. The light modulation element may be a reflective liquid crystal light valve or a digital mirror device.

In addition, the display device is not limited to a projector and may be a head-mounted display.

What is claimed is:

1. A display device used by being connected to an external video apparatus that reproduces a content, comprising:
    a signal determining section that determines the type of a video signal of the content input from the external video apparatus;
    a display setting section that makes display settings based on the type thus determined;
    a display section that displays the content based on the set display settings; and
    a request signal transmitting section that transmits, to the external video apparatus, a first request signal for starting reproduction of the content and a second request signal for reproducing the content from the head thereof after the display setting section makes display settings,
    wherein the display section maintains a video display prohibited state from before transmission of the first request signal until after transmission of the second request signal and until the reproduction of the content is started.

2. The display device according to claim 1, further comprising:
    a reproduction position determining section that determines a reproduction start position of the content,
    wherein the request signal transmitting section transmits the first request signal,
when the reproduction start position thus determined is the head of the content, transmits the second request signal, and
when the reproduction start position is not the head of the content, transmits a pause request signal for temporarily stopping the reproduction of the content after the reproduction start position is determined and transmits a resumption request signal for resuming the reproduction of the content after the display setting section makes display settings.

3. The display device according to claim 1, wherein the display section projects the content onto a screen.

4. The display device according to claim 1, wherein a sound signal is added to the video signal, and the content is a content containing video and sound.

5. The display device according to claim 1, wherein the display settings include at least one of screen display size setting, refresh rate setting, and screen aspect ratio setting of the display section.

6. A method for controlling a display device used by being connected to an external video apparatus that reproduces a content, comprising:
causing the display device to
determine the type of a video signal of the content input from the external video apparatus,
make display settings based on the type thus determined,
display the content based on the set display settings, and
transmit, to the external video apparatus, a first request signal for starting reproduction of the content and a second request signal for reproducing the content from the head thereof after display settings are made,
wherein the display device maintains a video display prohibited state from before transmission of the first request signal until after transmission of the second request signal and until the reproduction of the content is started.

7. A display device used by being connected to an external video apparatus that reproduces a content, comprising:
a signal determining section that determines the type of a video signal of the content input from the external video apparatus;
a display setting section that makes display settings based on the type thus determined;
a display section that displays the content based on the set display settings;
a request signal transmitting section that transmits, to the external video apparatus, a first request signal for starting reproduction of the content and a second request signal for reproducing the content from the head thereof after the display setting section makes display settings; and
a reproduction position determining section that determines a reproduction start position of the content,
wherein the request signal transmitting section
transmits the first request signal,
when the reproduction start position thus determined is the head of the content, transmits the second request signal, and
when the reproduction start position is not the head of the content, transmits a pause request signal for temporarily stopping the reproduction of the content after the reproduction start position is determined and transmits a resumption request signal for resuming the reproduction of the content after the display setting section makes display settings.

* * * * *